(12) United States Patent
Fischbach et al.

(10) Patent No.: US 11,548,343 B2
(45) Date of Patent: Jan. 10, 2023

(54) ADAPTER PIECE FOR CONNECTING A DAMPER TUBE AND AN AIR SPRING PISTON IN A NON-POSITIVE MANNER, AIR SPRING DAMPER SYSTEM, AND METHOD FOR PRODUCING AN AIR SPRING DAMPER SYSTEM

(71) Applicants: ThyssenKrupp Bilstein GmbH, Ennepetal (DE); thyssenkrupp AG, Essen (DE)

(72) Inventors: Lars Fischbach, Dortmund (DE); Manuel Gross, Witten (DE)

(73) Assignees: THYSSENKRUPP BILSTEIN GMBH, Ennepetal (DE); THYSSENKRUPP AG, Essen (GE)

( * ) Notice: Subject to any disclaimer, the term of this patent is extended or adjusted under 35 U.S.C. 154(b) by 267 days.

(21) Appl. No.: 16/405,230

(22) Filed: May 7, 2019

(65) Prior Publication Data
US 2019/0344633 A1 Nov. 14, 2019

(30) Foreign Application Priority Data
May 11, 2018 (DE) ...................... 10 2018 207 372.4

(51) Int. Cl.
*B60G 15/12* (2006.01)
*F16F 9/084* (2006.01)
*F16F 1/02* (2006.01)

(52) U.S. Cl.
CPC ........ *B60G 15/12* (2013.01); *B60G 2202/314* (2013.01); *B60G 2204/1262* (2013.01); *F16F 1/028* (2013.01); *F16F 9/084* (2013.01)

(58) Field of Classification Search
CPC .......... F16F 9/084; F16F 9/057; F16F 9/0209; F16F 1/028; B60G 15/12; B60G 15/14; B60G 2202/314; B60G 2204/1262
See application file for complete search history.

(56) References Cited

U.S. PATENT DOCUMENTS

| | | | | |
|---|---|---|---|---|
| 1,126,971 A | * | 2/1915 | Fowler | F16C 27/02 384/200 |
| 3,197,243 A | * | 7/1965 | Brenneke | F16C 27/00 384/252 |
| 3,350,042 A | * | 10/1967 | Stewart | F16F 1/3732 267/141.4 |

(Continued)

FOREIGN PATENT DOCUMENTS

| | | |
|---|---|---|
| CN | 1824969 A | 8/2006 |
| CN | 1984790 A | 6/2007 |

(Continued)

*Primary Examiner* — Bradley T King
(74) *Attorney, Agent, or Firm* — thyssenkrupp North America, LLC

(57) ABSTRACT

An adapter piece may be employed to connect a damper tube and an air spring piston in a non-positive manner. The adapter piece may comprise a spring region. The adapter piece may also include a first ring region and a second ring region, and the spring region may be positioned between the first ring region and the second ring region. Further, an air spring damper system may utilize the spring region of such an adapter piece to connect a damper tube and an air spring piston in a non-positive connection. The damper tube may include a bulge with a supporting element positioned on the bulge. The adapter piece may lie on the supporting element.

17 Claims, 5 Drawing Sheets

(56) References Cited

U.S. PATENT DOCUMENTS

| | | | | |
|---|---|---|---|---|
| 3,532,319 A * | 10/1970 | Brown | F16F 1/3732 | 267/141.4 |
| 3,621,949 A * | 11/1971 | Watson | F16F 9/363 | 188/284 |
| 4,022,448 A * | 5/1977 | Reeder | F16F 9/084 | 267/226 |
| 4,529,213 A * | 7/1985 | Goodman | F16F 9/38 | 188/322.12 |
| 4,555,096 A * | 11/1985 | Pryor | B60G 15/14 | 267/220 |
| 4,771,994 A * | 9/1988 | Makita | B60G 15/14 | 267/220 |
| 5,636,831 A * | 6/1997 | Gubitz | F16F 9/05 | 267/220 |
| 5,769,401 A * | 6/1998 | Pradel | B60G 15/12 | 206/335 |
| 6,336,610 B1 * | 1/2002 | Wode | B60G 15/12 | 188/322.16 |
| 6,827,342 B2 * | 12/2004 | Klitsch | B60G 15/12 | 188/322.12 |
| 8,991,798 B2 * | 3/2015 | Eike | B60G 15/14 | 267/64.24 |
| 10,752,071 B2 * | 8/2020 | Gleu | F16F 9/05 | |
| 2003/0155198 A1 | 8/2003 | Muller | | |
| 2005/0061594 A1 * | 3/2005 | Borgmeier | F16F 9/084 | 188/315 |
| 2006/0191757 A1 | 8/2006 | Kojima | | |
| 2007/0246316 A1 | 10/2007 | Brunneke | | |
| 2014/0376844 A1 | 12/2014 | Swanson | F16C 27/02 | 29/898.12 |
| 2015/0014907 A1 * | 1/2015 | Reichmann | B60G 15/12 | 267/219 |
| 2016/0108985 A1 * | 4/2016 | Pniewski | F16F 9/084 | 267/64.24 |
| 2017/0219041 A1 * | 8/2017 | Debruler | F16F 9/057 | |

FOREIGN PATENT DOCUMENTS

| | | |
|---|---|---|
| DE | 35 42 942 A | 6/1986 |
| DE | 102 44 776 A | 9/2003 |
| DE | 103 36 147 A | 4/2004 |
| DE | 10 2017 211 139 A | 3/2018 |

\* cited by examiner

ADAPTER PIECE FOR CONNECTING A DAMPER TUBE AND AN AIR SPRING PISTON IN A NON-POSITIVE MANNER, AIR SPRING DAMPER SYSTEM, AND METHOD FOR PRODUCING AN AIR SPRING DAMPER SYSTEM

CROSS-REFERENCE TO RELATED APPLICATION

This application is a non-provisional application claiming priority to German Patent Application No. DE 10 2018 207 372.4, which was filed May 11, 2018, the entire contents of which are hereby incorporated by reference herein.

FIELD

The present disclosure generally relates to adapter pieces for connecting damper tubes and air spring pistons in a non-positive manner, to air spring damper systems that may include a damper tube and an air spring piston, and to methods for producing such air spring damper systems.

BACKGROUND

Air spring dampers are used in suspension and in the course of damping of vibrations/jolts which act on vehicles, and are distinguished, inter alia, by a high flexibility of the setting of the prestress. In this way, the height of the vehicle body can be adjusted or set, for example, with the aid of an air suspension system.

Arrangements are known from the prior art, in the case of which arrangements the rolling piston or air spring piston is fixed directly on the damper tube, for example by way of welding. Here, however, the components are connected irreversibly and expensively. Furthermore, air spring damper systems which are known from the prior art have the disadvantage, inter alia, that there is not sufficient security for suppressing relative rotations of the damper tube and the air spring.

DETAILED DESCRIPTION

Figure 1:
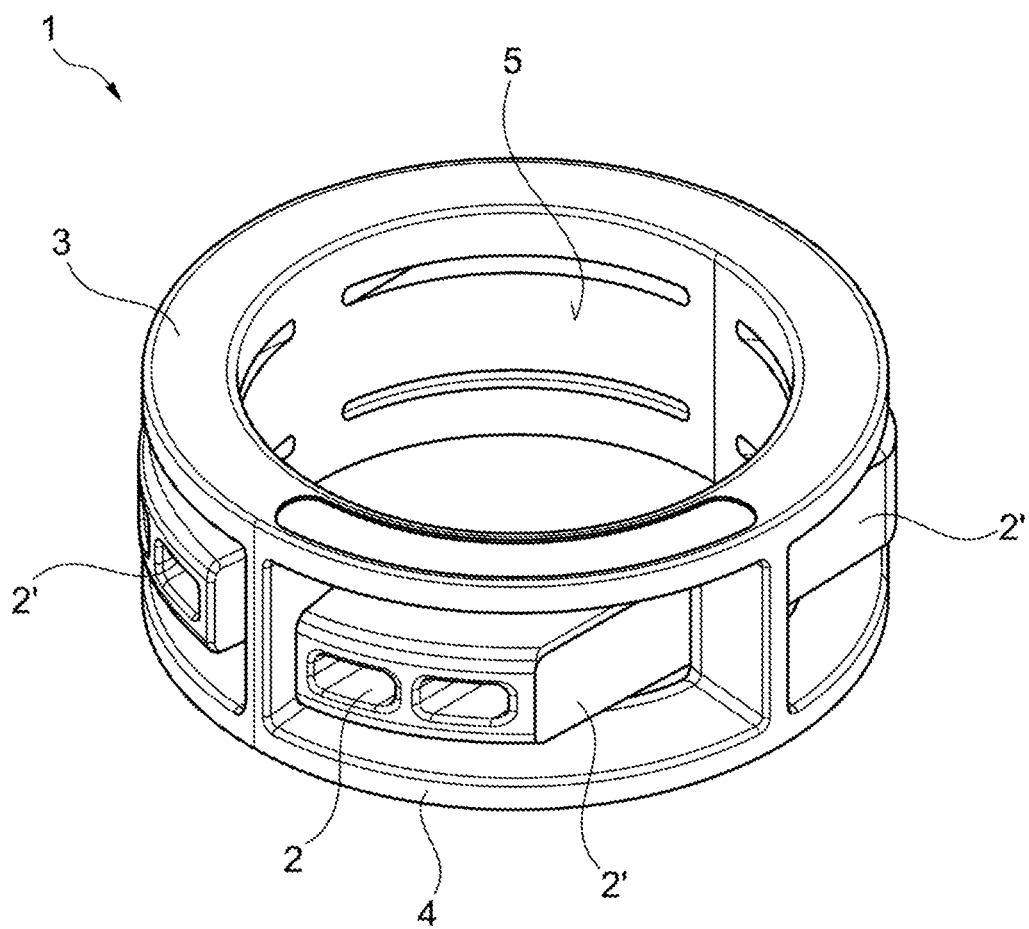
FIG. 1 is a perspective view of an example adapter piece.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, an air spring damper system may comprise a damper tube and an air spring piston, which air spring damper system can be produced in an uncomplicated and rapid manner and/or can advantageously prevent rotational movements between the damper tube and the air spring piston.

In some respects, the present disclosure concerns an adapter piece for connecting a damper tube and an air spring piston in a non-positive manner, the adapter piece comprising a spring region.

As a result, it is possible according to the disclosure that a non-positive connection between firstly the damper tube and secondly the air spring piston of an air suspension system can be established with the aid of an (elastic) spring region of an adapter piece. Therefore, other connecting methods, for example welding of the damper tube and the air spring piston, can preferably be dispensed with, which makes cost-efficient and material-protecting production possible. At the same time, relative rotational movements between the damper tube and the air spring piston can be prevented particularly advantageously by way of the adapter element according to the disclosure. It is preferred that the adapter piece can be installed in a non-oriented manner (that is to say, at any desired rotary angle about a main extent axis of the damper tube). Furthermore, the adapter element can be a clamping sleeve.

It is provided in accordance with one embodiment of the present disclosure that the adapter piece comprises a first ring region and a second ring region, the spring region being arranged between the first ring region and the second ring region. As a result, it is possible in accordance with one embodiment of the present disclosure that the spring region is arranged between a first ring region and a second ring region with regard to a main extent axis of the damper tube. A compact adapter piece can be provided in this way. In general, other geometric embodiments of the adapter piece are also conceivable.

It is possible in accordance with embodiments of the present disclosure that the adapter piece has a hole, in particular a centred hole, which is configured to receive a damper tube.

A further subject matter of the present disclosure is an air spring damper system, comprising a damper tube and an air spring piston, characterized in that the air spring damper system comprises an adapter piece according to one of the preceding claims, a non-positive connection between the air spring piston and the damper tube being configured with the aid of the spring region.

It is provided here according to the disclosure, in particular, that a non-positive connection is configured both between the adapter piece (or the spring region of the adapter piece) and the damper tube and between the adapter piece (or the spring region of the adapter piece) and the air spring piston. In this way, a non-positive connection is configured overall between the air spring piston and the damper tube.

The above embodiments and advantages of an adapter piece according to the disclosure can likewise be applied to the air spring damper system according to the disclosure, comprising a damper tube and an air spring piston.

It is possible according to the disclosure, in particular, that the adapter piece is arranged in the radial direction (that is to say, perpendicularly with respect to a main extent axis of the damper tube) between the damper tube and the air spring piston. The non-positive connection between the damper tube and the adapter piece (with the aid of the spring region) is preferably produced only by way of the assembly of the air spring damper system, comprising a damper tube, an adapter piece and an air spring piston, and only by virtue of the fact that the air spring piston is pushed over the adapter piece and the spring region.

It is provided in accordance with one embodiment of the present disclosure that the damper tube has a bulge, a supporting element being arranged on the bulge, the adapter piece lying on the supporting element. Here, the bulge is provided, in particular, as an outwardly curved region. As a result it is advantageously possible that a supporting element (for example, in the form of a supporting ring) with a middle/centred hole for receiving the damper tube is used, the supporting element contributing to the fixing of the adapter element. In the assembled state of the air spring damper system, the supporting element can be arranged between (with regard to the main extent axis of the damper tube) the bulge and the adapter element. Here, the bulge is configured at least on the outer wall of the damper tube.

It is provided in accordance with one embodiment of the present disclosure that an outer wall of the damper tube and an inner wall of the adapter piece are configured with a clearance fit, in particular in relation to a non-assembled state of the air spring damper system. As a result, it is possible that the non-positive connection between the damper tube and the adapter piece (with the aid of the spring region) is produced only by way of the assembly, in particular only by virtue of the fact that the air spring piston is pushed over the adapter piece and the spring region. Before this, the adapter piece can be applied to the damper tube in a particularly simple manner by way of the clearance fit between the adapter piece and the damper tube, which makes particularly efficient, rapid and simple production possible.

It is provided in accordance with one embodiment of the present disclosure that the adapter piece is configured as a component which is separate from the damper tube and the air spring piston. This also applies, in particular, to an assembled state of the air spring damper system, with the result that no integrally joined connection is established between the damper tube, the adapter piece and the air spring piston during the production of the system.

It is provided in accordance with one embodiment of the present disclosure that the spring region is of elastic configuration along a radial axis of the damper tube. As a result, the adapter piece can be used particularly advantageously for the non-positive connection between the damper tube and the air spring piston, the non-positive connection being produced only by way of joining together of the components, in particular pushing of the air spring piston onto the adapter piece (and the damper tube). It is in general conceivable that the spring region has one or more elastic material components. It is likewise conceivable that the spring region is completely of elastic configuration (and not only along a radial axis).

A further subject matter of the disclosure is a method for producing an air spring damper system in accordance with one embodiment of the present disclosure, the spring region of the adapter piece being compressed in a first step, during a relative assembly movement of the damper tube and the air spring piston from a non-assembled state into an assembled state.

As a result, it is possible according to the disclosure to achieve a particularly efficient and cost-saving method for producing an air spring damper system. It is possible at the same time to prevent relative rotational movements between the damper tube and the air spring piston in the assembled state of the air spring damper system.

It is provided in accordance with one embodiment of the present disclosure that a non-positive connection is configured between the damper tube and the air spring piston in the first step with the aid of the compression of the spring region.

It is provided in accordance with one embodiment of the present disclosure that the damper tube and the air spring piston are moved relative to one another in the first step during the relative assembly movement along a main extent axis of the damper tube. In the course of this, the air spring piston can be pushed/pressed over the adapter piece and, in particular, over the spring region.

It is provided in accordance with one embodiment of the present disclosure that the adapter piece is arranged, before the first step, on a bulge of the damper tube, or on a supporting element which is arranged on a bulge of the damper tube, or on a supporting element which is connected to the damper tube in an integrally joined manner, the adapter piece being moved relative to the air spring piston in the first step during the relative assembly movement, and being substantially stationary, in particular, relative to the damper tube. It is conceivable, for example, that a spring collar is welded to the damper tube. Other fastening forms also come into question.

It is provided in accordance with one embodiment of the present disclosure that an inner wall of the adapter piece and an outer wall of the damper tube are configured with a clearance fit before the first step. The inner wall of the adapter piece relates here to that wall of the adapter piece which points in the direction of the damper tube, and the outer wall of the damper tube relates here to that wall of the damper tube which points in the direction of the adapter piece (or at least to a part region thereof).

The features, refinements and advantages which have been described in conjunction with the adapter piece according to the disclosure or in conjunction with an embodiment of the adapter piece according to the disclosure can be used for the air spring damper system according to the disclosure and the method according to the disclosure for producing an air spring damper system.

The features, refinements and advantages which have been described in conjunction with the air spring damper system according to the disclosure or the method according to the disclosure for producing an air spring damper system or in conjunction with an embodiment of the air spring damper system according to the disclosure or an embodiment of the method according to the disclosure for producing an air spring damper system can be used for the adapter piece according to the disclosure.

Figure 2:
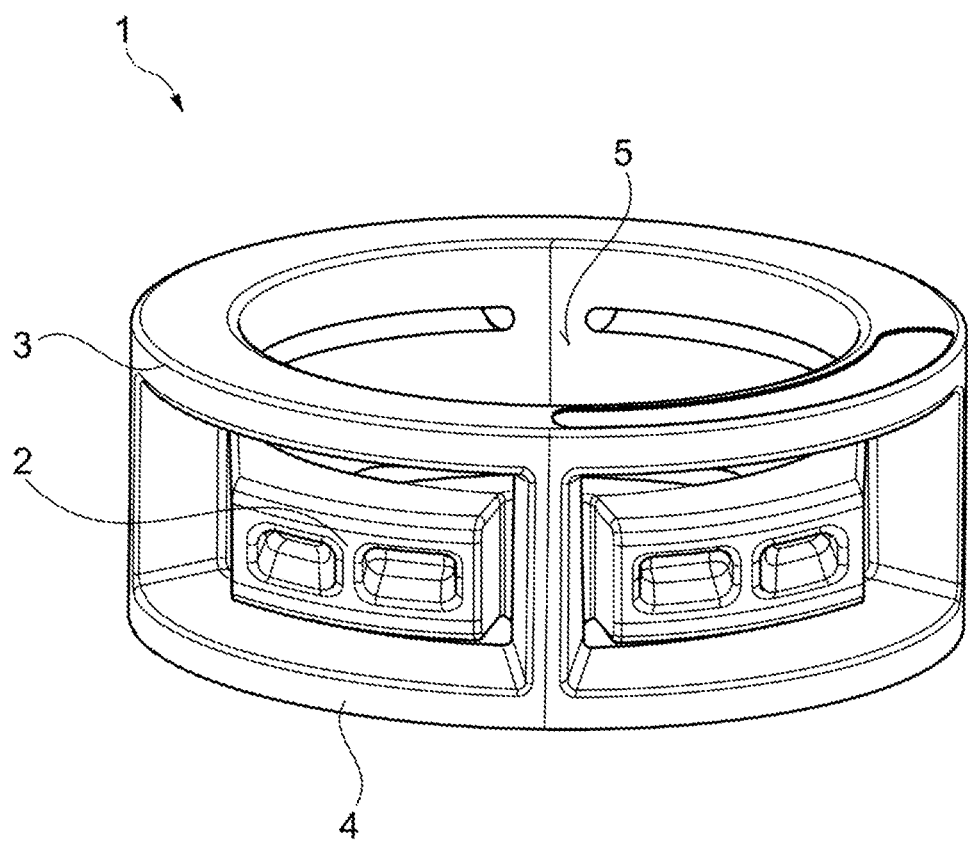
FIG. 2 is another perspective view of an example adapter piece.

FIG. 1 shows a diagrammatic illustration of an adapter piece 1 in accordance with one embodiment of the present disclosure. Here, in the embodiment which is shown, the adapter piece 1 comprises an elastic spring region 2 which comprises a total of four part regions 2' or spring elements 2' (of which three can be seen as a result of the selected perspective illustration in FIG. 1). As an alternative, another number of part regions 2' or pressure pads is also conceivable. The spring region 2 (or its part regions 2') can be compressed by way of a normal force which acts radially in the direction of the centre of the adapter piece 1. In the embodiment which is shown, the part regions 2' comprise in each case two depressions or holes and are configured as pressure pads. The depressions serve primarily to save material and to configure identical wall thicknesses. As an alternative, other geometries for the part regions 2' are also conceivable. An inner wall 5 of the adapter piece 1 is situated so as to lie radially on the inside. A first ring region 3 is configured at the upper end of the adapter piece 1, and a second ring region 4 is configured at the lower end of the adapter piece 1. The spring region 2 is situated between the said two ring regions 3, 4. The adapter piece 1 comprises a base area of substantially annular configuration and a central hole, into which a damper tube 10 can be introduced. As a result, the adapter piece 1 can be used as an intermediate piece for a non-positive connection between a damper tube 10 and an air spring piston 20, in particular for a motor vehicle. As a result of its design, the adapter piece 1 can advantageously be installed in a non-oriented manner. FIG. 2 shows a further diagrammatic illustration of that embodiment of an adapter piece 1 which is shown in FIG. 1.

Figure 3:
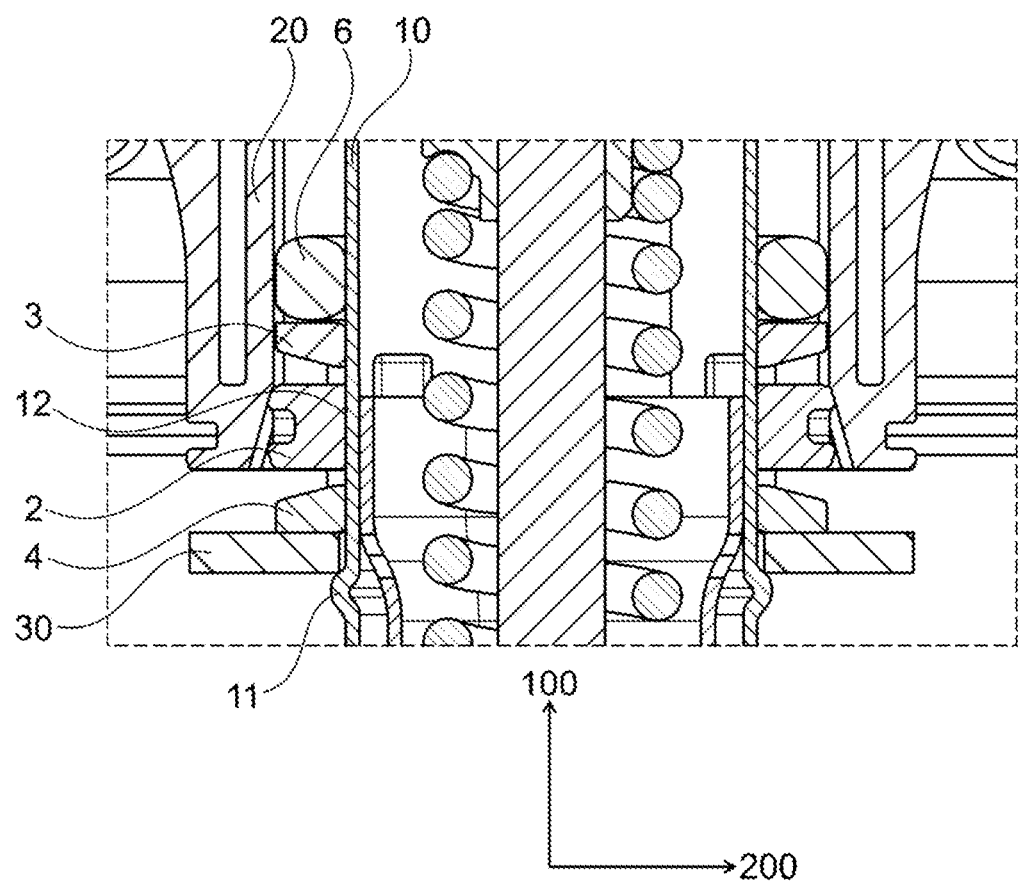
FIG. 3 is a sectional view of an example air spring damper system during an assembly movement.

FIG. 3 shows a diagrammatic illustration of an air spring damper system, comprising a damper tube 10, an air spring piston 20 and an adapter piece 1, in accordance with one embodiment of the present disclosure during an assembly movement. Accordingly, FIG. 3 shows the air spring damper system during the first step in accordance with one embodiment of the present disclosure. Here, during the first step, a damper tube 10 is pushed into a receptacle of an air spring piston 20. The damper tube 10 is widened in the region of a bulge 11 which extends in an annular manner around the damper tube 10. A supporting element 30 in the form of a disc with a central hole is arranged on the bulge 11. As a result of the bulge 11, the disc cannot move downwards relative to the damper tube 10. An adapter piece 1 is arranged on the supporting element 30. Here, the adapter piece 1 comprises the features which were described in the course of FIGS. 1 and 2 and therefore, inter alia, the spring region 2. In a non-assembled state (that is to say, before the first step which is shown in FIG. 3 and before the assembly movement), the adapter element 1 and the damper tube 10 are configured with a clearance fit, with the result that the adapter piece 1 can be pushed easily onto the damper tube 10. An O-ring 6 is arranged above the adapter piece 1 for sealing purposes. During the assembly movement (shown in FIG. 3) along a main extent axis 100 of the damper tube 10, the damper tube 10, the adapter piece 1 and the supporting element 30 and the O-ring 6 are then moved relative to the air spring piston 30, in particular in such a way that the air spring piston 20 is pushed over the arrangement, comprising the damper tube 10, the adapter piece 1, the supporting element 30 and the O-ring 6. Accordingly, in the embodiment which is shown in FIG. 3, the air spring piston 20 is moved downwards here and/or the arrangement, comprising the damper tube 10, the adapter piece 1, the supporting element 30 and the O-ring 6, is moved upwards. Here, the air spring piston 30 compresses the spring region 2 of the adapter piece 1, and presses it against the outer wall 12 of the damper tube 10. A radial force is produced in this way along the radial axis 200, with the aid of which radial force a non-positive connection is established between the damper tube 10, the adapter piece 1 and the air spring piston 20, which also prevents rotational movements between the damper tube 10 and the air spring piston 20.

Figure 4:
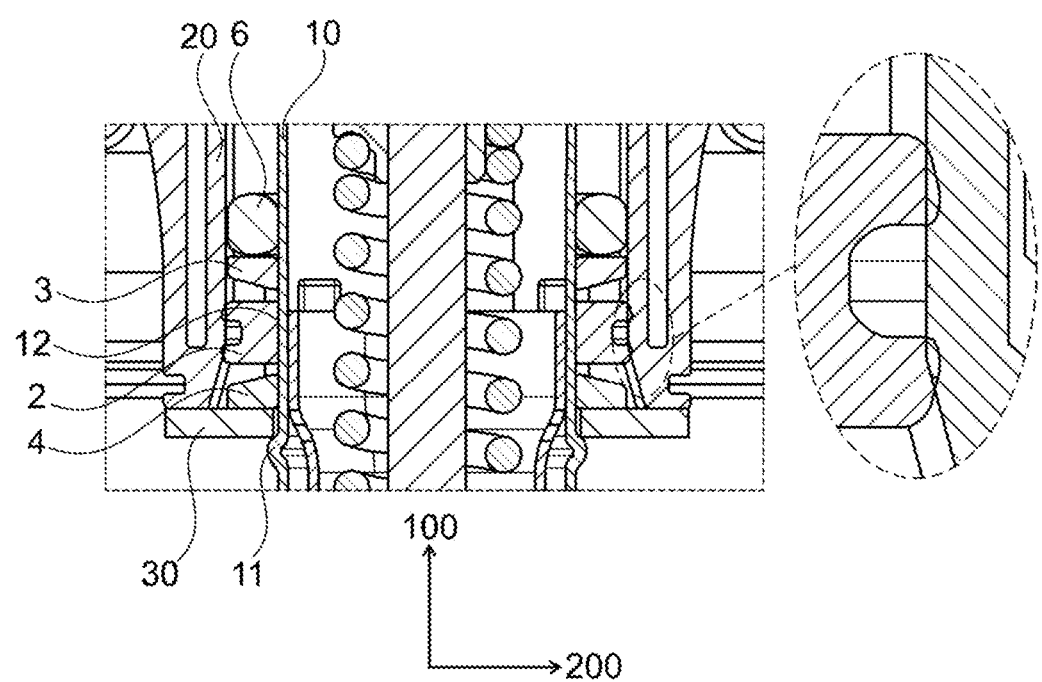
FIG. 4 is a sectional view of an example air spring damper system in an assembled state.
Figure 5:
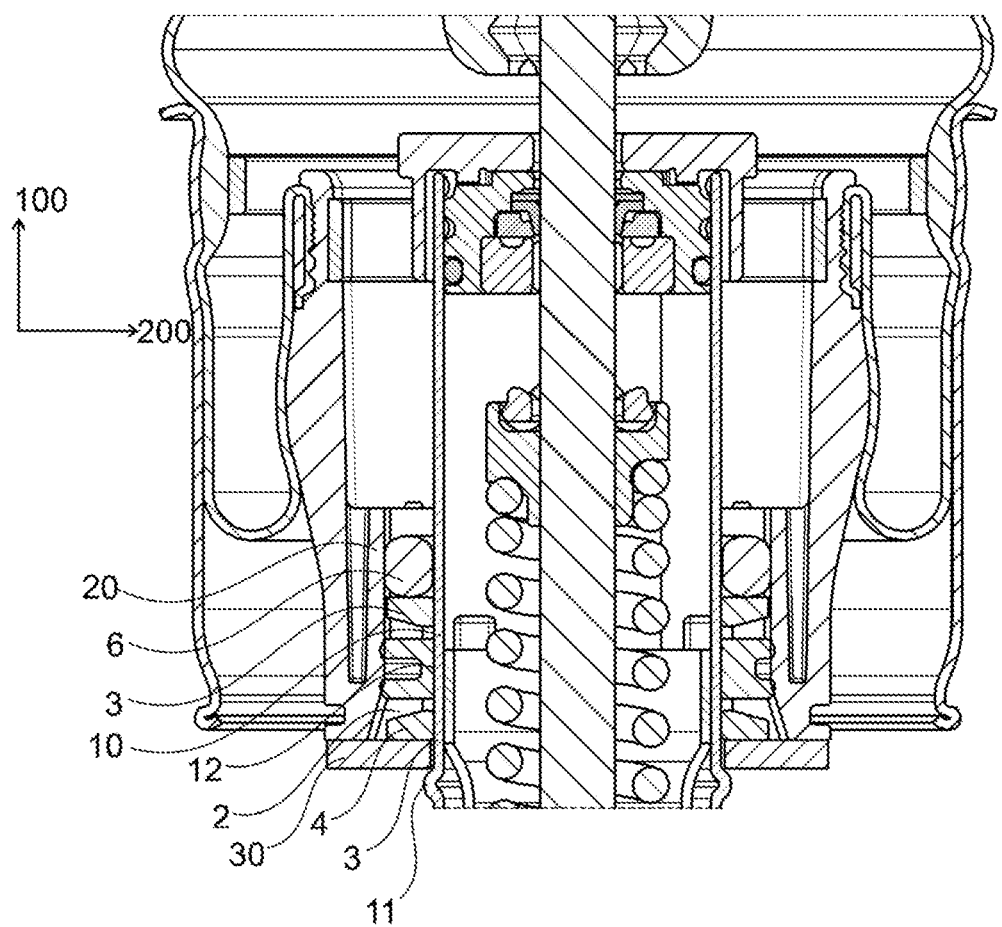
FIG. 5 is another sectional view of an example air spring damper system in an assembled state.

FIGS. 4 and 5 show the embodiment (shown in FIG. 3) of an air spring damper system, comprising a damper tube 10, an air spring piston 20 and an adapter piece 1, in an assembled state (that is to say, after the first step). Here, the air spring piston 20 is pushed completely over the adapter piece 1 and adjoins the supporting element 30. The spring region 2 of the adapter piece 1 is therefore compressed and establishes the non-positive connection between the damper tube 10 and the air spring piston 20. As shown, for example, a helical spring and a spring collar are arranged within the damper tube 10.

LIST OF REFERENCE NUMERALS

1 Adapter piece
2 Spring region
2' Part region
3 First ring region
4 Second ring region
5 Inner wall
6 O-ring
10 Damper tube
11 Bulge
12 Outer wall
20 Air spring piston
30 Supporting element
100 Main extent axis
200 Radial axis

What is claimed is:

1. An adapter piece for connecting a damper tube and an air spring piston in a non-positive manner, wherein the adapter piece comprises a spring region having multiple distinct spring part regions disposed in a single radial plane of the adapter piece, wherein the spring part regions are discontinuous in a circumferential direction, wherein each spring part region is cantilevered such that a line extending radially from a radially outermost portion of the spring part region through a radially innermost portion of the spring part region where the spring part region is supported on an inner wall of the adapter piece intersects a longitudinal axis that is perpendicular to the single radial plane and extends through a center of the adapter piece, wherein a base of each spring part region is integral with a remainder of the adapter piece, wherein each spring part region extends from the radially innermost portion of the adapter piece to the radially outermost portion of the adapter piece, wherein the base of each spring part region is disposed at the radially innermost portion of the adapter piece.

2. The adapter piece of claim 1 wherein a slot extends in the circumferential direction above and below the base of each spring part region, wherein a central portion of the inner wall of the adapter piece, which is located longitudinally between a pair of the slots associated with each spring part region, forms a closed loop.

3. The adapter piece of claim 1 consisting of exactly four of the multiple distinct spring part regions, wherein a different one of the multiple distinct spring part regions is disposed in each quadrant of the single radial plane.

4. The adapter piece of claim 1 wherein a radially-outward-facing surface of each of the multiple distinct spring part regions includes a depression or a hole.

5. The adapter piece of claim 1 wherein each of the multiple distinct spring part regions extends outwards in a different direction from a radially innermost wall of the adapter piece.

6. The adapter piece of claim 1 wherein each of the multiple distinct spring part regions is cantilevered and has five distinct sides that face different directions.

7. The adapter piece of claim 1 wherein each of the multiple distinct spring part regions has a first pair of opposing surfaces and a second pair of opposing surfaces, wherein a central axis of each spring part region occupies a space halfway between the first pair of opposing surfaces and halfway between the second pair of opposing surfaces and is nonintersecting with the first and second pair of opposing surfaces, wherein the central axes of the multiple distinct spring part regions are nonintersecting with a longitudinal axis that extends through a center of the adapter piece, wherein a first and a second of the multiple distinct spring part regions share the same central axis.

8. The adapter piece of claim 1 wherein each of the multiple distinct spring part regions has planar sides.

9. The adapter piece of claim 1 wherein longitudinally-extending walls of the adapter piece are disposed on both circumferential sides of each spring part region so as to separate each spring part region circumferentially.

10. An adapter piece for connecting a damper tube and an air spring piston in a non-positive manner, wherein the adapter piece comprises:
   a spring region having multiple distinct spring part regions disposed in a single radial plane of the adapter piece, wherein the spring part regions are discontinuous in a circumferential direction, wherein each spring part region is cantilevered such that a line extending radially from a radially outermost portion of the spring part region through a radially innermost portion of the spring part region where the spring part region is supported on an inner wall of the adapter piece intersects a longitudinal axis that is perpendicular to the single radial plane and extends through a center of the adapter piece;
   a first ring region;
   a second ring region; and
   cavities that open radially outward, wherein in an axial direction the cavities are disposed directly between and defined at least in part by the first and second ring regions,
   wherein the spring part regions are disposed in the axial direction between the first and second ring regions, wherein a majority of each spring part region overlaps radially with the first and second ring regions.

11. The adapter piece of claim 10 wherein the spring region is elastic in the single radial plane.

12. The adapter piece of claim 10 wherein excluding an upper surface of the first ring region and a lower surface of the second ring region, the adapter piece is symmetric across the single radial plane and across at least one plane that is orthogonal to the single radial plane.

13. The adapter piece of claim 10 wherein the first and second ring regions are closed loops.

14. A method for producing an air spring damper system that includes a damper tube, an air spring piston, and an adapter piece for connecting the damper tube and the air spring piston in a non-positive manner, wherein a non-positive connection exists between the air spring piston and the damper tube via a spring region of the adapter piece, the method comprising compressing in a radially inward direction multiple, distinct, outward-facing spring regions of the spring region of the adapter piece that are cantilevered so as to extend from an inner wall of the adapter piece and so as to be unsupported from axially above and below during a relative assembly movement of the damper tube and the air spring piston such that after the relative assembly movement in an assembled state the multiple, distinct, outward-facing spring regions of the spring region extend between and are in direct contact with both the air spring piston and the damper tube, with contact between the multiple, distinct, outward-facing spring regions and the air spring piston being discontinuous in a circumferential direction.

15. The method of claim 14 wherein the non-positive connection is formed between the damper tube and the air spring piston via the compression of the multiple, distinct, outward-facing spring regions of the adapter piece.

16. The method of claim 14 wherein prior to the compression of the multiple, distinct, outward-facing spring regions, the method comprises positioning the adapter piece
   on a bulge of the damper tube, or
   on a supporting element disposed on a bulge of the damper tube,
   the adapter piece being moved relative to the air spring piston during the relative assembly movement, and being substantially stationary relative to the damper tube.

17. The method of claim 14 wherein compressing the multiple, distinct, outward-facing spring regions of the spring region of the adapter piece during the relative assembly movement comprises elastically deforming connecting portions of the adapter piece where each of the multiple, distinct, outward-facing spring regions is connected to a radially innermost portion of the adapter piece.

\* \* \* \* \*